United States Patent Office 3,567,754
Patented Mar. 2, 1971

3,567,754
ALKYLMETHYLSILANES
Richard W. Alsgaard, Midland, Mich., assignor to Dow Corning Corporation, Midland, Mich.
No Drawing. Filed Aug. 15, 1968, Ser. No. 752,778
Int. Cl. C07f 7/08
U.S. Cl. 260—448.2          4 Claims

ABSTRACT OF THE DISCLOSURE

Alkylmethylsilanes and alkyldimethylsilanes having alkyl groups of 12 to 45 carbon atoms are disclosed. The alkylmethylsilanes are useful as evaporation retardants.

This invention relates to alkylmethylsilanes.

An object of the present invention is to provide a new class of alkylmethylsilanes which are useful as evaporation retardants.

The present invention relates to an alkylmethylsilane of the formula $$(C_nH_{2n+1})SiH_{(3-x)}(CH_3)_x$$

in which $n$ is an integer of from 12 to 45 inclusive and $x$ is an integer of from 1 to 2 inclusive.

The alkylmethylsilanes can best be prepared by reacting an α-olefin with $H(CH_3)SiCl_2$ or $H(CH_3)_2SiCl$ in the presence of a platinum catalyst, such as chloroplatinic acid. The resulting product has a formula $$(C_nH_{2n+1})\underset{|}{\overset{CH_3}{Si}}Cl_2 \text{ or } (C_nH_{2n+1})\underset{|}{\overset{(CH_3)_2}{Si}}Cl$$

The chlorosilanes are then mixed with lithium aluminum hydride to produce the corresponding hydrides of the formulae $$(C_nH_{2n+1})\underset{|}{\overset{CH_3}{Si}}H_2 \text{ and } (C_nH_{2n+1})\underset{|}{\overset{(CH_3)_2}{Si}}H$$

The α-olefin can be any alkene which has a carbon-carbon double bond at a terminal carbon atom and which has 12 to 45 carbon atoms. The α-olefins can be either straight chained or branched and include, for example, α-dodecene, α-pentadecene, α-tridecene, α-octadecene, α-tetradecene, $CH_2=CH(CH_2)_{17}CH_3$, $$CH_2=CH(CH_2)_{42}CH_3$$

$CH_2=CH(CH_2)_{26}CH_3$, $CH_2=CHC[(CH_2)_{10}CH_3]_2$, $$CH_2=CH(CH_2)_{30}CH_3$$

$CH_2=CH(CH_2)_{19}CH_3$, $$CH_2=CH(CH_2)_4CH(CH_3)(CH_2)_{12}CH_3$$

and $CH_2=CH(CH_2)_{13}CH(CH_3)_2$.

The alkylmethylsilanes of the present invention can include, for example,

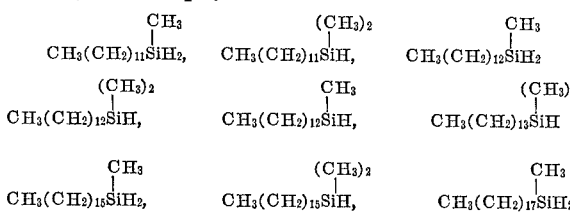

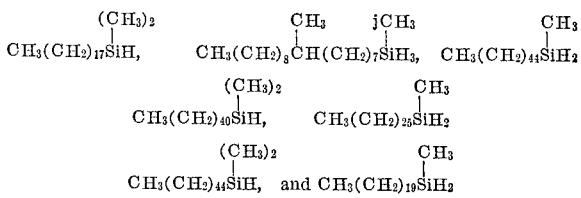

The alkylmethylsilanes of the present invention are particularly useful as evaporation retardants. The alkylmethylsilanes are applied to the surface of an aqueous body which is exposer to a gaseous atmosphere. The amount of alkylmethylsilane applied is determined by several factors, such as, temperature of the aqueous body, temperature of the atmosphere above the aqueous body and the movement of the atmosphere or the aqueous body. The amount of the alkylmethylsilane is usually applied to provide at least a monomolecular layer on the aqueous surface. However, more or less can be used depending upon the desired result. If one desires to control the rate of evaporation, one can apply less of the alkylmethylsilane to provide some specific rate of evaporation which can be used as a means of controlling the temperature of an aqueous body.

The aqueous body can be a swamp, a field covered with water, a pond, a lake, a reservoir, or in a tank, in a ditch, in a dish, in a closed container with a controlled atmosphere and the like.

The alkylmethylsilanes can be applied to the aqueous body as is or in the form of an organic solution or by any other means suitable to disperse the compound over the aqueous surface.

The alkylmethylsilanes of the present invention retard the evaporation of water.

The following examples are illustrative only and should not be construed as limiting the invention which is properly delineated in the appended claims.

EXAMPLE 1

A mixture of 9.5 g. of $H(CH_3)_2SiCl$ and 25.3 g. of octadecene-1 was placed in a bottle and 3 drops of a one weight percent platinum as chloroplatinic acid in isopropanol was added. The resulting mixture was placed in a 110° C. oven overnight and then allowed to stand for two weeks. The mixture was then distilled and

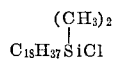

was obtained.

A solution of 2.07 g. of the octadecyldimethylchlorosilane in tetrahydrofuran was prepared. To a mixture of 0.65 g. of $LiAlH_4$ in tetrahydrofuran, the octadecyldimethylchlorosilane was added. After the evolution of gas stopped, the mixture was filtered and the filtrate was allowed to stand over the weekend in hood to evaporate the solvent. The product was

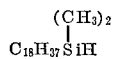

EXAMPLE 2

Mixed 11.5 g. of $H(CH_3)SiCl_2$, 23.3 g. of octadecene-1, and 2 drops of one weight percent platinum as chloroplatinic acid in isopropanol in a two ounce bottle. The bottle was capped and placed in a 110° C. oven overnight. The resulting mixture was distilled and was

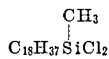
$$C_{18}H_{37}\overset{CH_3}{\underset{|}{Si}}Cl_2$$

Dissolved 3.5 g. of the octadecylethyldichlorosilane in tetrahydrofuran. Added 0.2 g. of LiAlH$_4$ to tetrahydrofuran and then added the octadecylmethyldichlorosilane solution to it. After the evolution of gas stopped, the mixture was filtered and the solvent evaporated from the filtrate. The product was a white solid of the formula

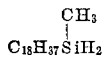
$$C_{18}H_{37}\overset{CH_3}{\underset{|}{Si}}H_2$$

EXAMPLE 3

A mixture of 19.6 g. of tetradecene-1, 9.4 g.

$$H(CH_3)_2SiCl$$

and 3 drops of a solution of one weight percent platinum as chloroplatinic acid in isopropanol was placed in a small bottle and then allowed to stand in a 120° C. oven overnight. The resulting mixture was distilled and the product collected was

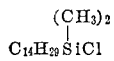
$$C_{14}H_{29}\overset{(CH_3)_2}{\underset{|}{Si}}Cl$$

To a mixture of 0.2 g. of LiAlH$_4$ in tetrahydrofuran, 5.8 g. of the tetradecyldimethylchlorosilane in tetrahydrofuran was added. After the evolution of gas stopped the mixture was filtered and the tetrahydrofuran was evaporated, leaving

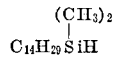
$$C_{14}H_{29}\overset{(CH_3)_2}{\underset{|}{Si}}H$$

as the product.

EXAMPLE 4

Ten weight percent solutions of monooctadecyldimethylsilane in diethyl ether, monooctadecylmonomethylsilane in diethyl ether and monotetradecyldimethylsilane in diethyl ether were prepared. Ten drops of each of these three ether solutions were placed on the surface of 100 g. of tap water in a 250 ml. stainless steel cup. The resulting assembly was placed in a controlled atmosphere of 65% relative humidity at 68° F. The weight of the cup, water and ether solution was initially made and then observed at time intervals of 1 day, 2 days, 5 days and 7 days. A control cup was also placed in the controlled atmosphere. The control was prepared as above but without any silane solution.

The results below are the weight percentages of water lost in a given period of time under the test conditions.

| Compound | Percent water loss after | | | | Percent savings over control |
|---|---|---|---|---|---|
| | 1 day | 2 days | 5 days | 7 days | |
| (1) Control | 7.3 | 14.7 | 35.0 | 47.2 | |
| (2) $C_{18}H_{37}\overset{CH_3}{\underset{|}{Si}}H_2$ | 4.0 | 7.5 | 16.0 | 26.0 | 44.9 |
| (3) $C_{18}H_{37}\overset{(CH_3)_2}{\underset{|}{Si}}H$ | 4.5 | 8.5 | 19.5 | 31.5 | 33.3 |
| (4) $C_{14}H_{29}\overset{(CH_3)_2}{\underset{|}{Si}}H$ | 4.5 | 10.0 | 15.0 | 25.5 | 46.0 |

EXAMPLE 5

When the following olefins are reacted with the designated methylchlorosilane by the process described in Example 2, the products as shown in the following table are obtained.

| Olefin | Silane | Product |
|---|---|---|
| $CH_2=CH(CH_2)_9CH_3$ | $H(CH_3)_2SiCl$ | $CH_3(CH_2)_{11}\overset{(CH_3)_2}{\underset{|}{Si}}H$ |
| $CH_2=CH(CH_2)_{17}CH_3$ | $H(CH_3)SiCl_2$ | $CH_3(CH_2)_{19}\overset{CH_3}{\underset{|}{Si}}H_2$ |
| $CH_2=CH(CH_2)_{42}CH_3$ | $H(CH_3)SiCl_2$ | $CH_3(CH_2)_{44}\overset{CH_3}{\underset{|}{Si}}H_2$ |
| $CH_2=CH(CH_2)_{42}CH_3$ | $H(CH_3)_2SiCl$ | $CH_3(CH_2)_{44}\overset{(CH_3)_2}{\underset{|}{Si}}H$ |
| $CH_2=CHCH[(CH_2)_{10}CH_3]_2$ | $H(CH_3)SiCl_2$ | $[CH_3(CH_2)_{10}]_2CH(CH_2)_2\overset{CH_3}{\underset{|}{Si}}H_2$ |
| $CH_2=CH(CH_2)_{26}CH_3$ | $H(CH_3)_2SiCl$ | $CH_3(CH_2)_{28}\overset{(CH_3)_2}{\underset{|}{Si}}H$ |

That which is claimed is:
1. An alkylmethylsilane of the formula

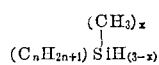
$$(C_nH_{2n+1})\overset{(CH_3)_x}{\underset{|}{Si}}H_{(3-x)}$$

in which $n$ is an integer of from 12 to 45 inclusive and $x$ is an integer of from 1 to 2 inclusive.
2. The alkylmethylsilane in accordance with claim 1 wherein $n$ is 18 and $x$ is 1.
3. The alkylmethylsilane in accordance with claim 1 wherein $n$ is 18 and $x$ is 2.
4. The alkylmethylsilane in accordance with claim 1 wherein $n$ is 14 and $x$ is 2.

References Cited

UNITED STATES PATENTS 2,129,281  9/1938  Lincoln et al. _____ 260—448.2X
3,291,760  12/1966  Bayer _____ 260—448.2X TOBIAS E. LEVOW, Primary Examiner P. E. SHAVER, Assistant Examiner U.S. Cl. X.R.

260—448.2R